UNITED STATES PATENT OFFICE.

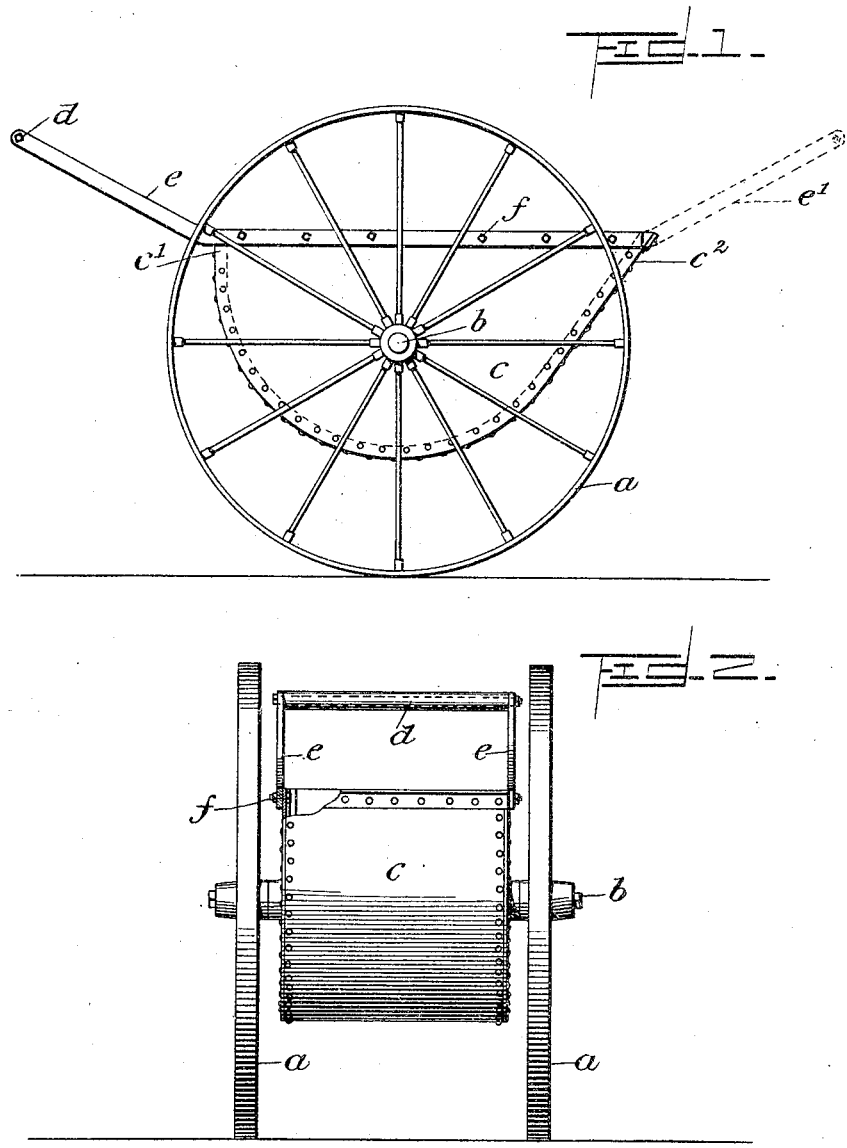

ARTHUR WILFRID RANSOME, OF NEW YORK, N. Y.

CART.

No. 807,129.  Specification of Letters Patent.  Patented Dec. 12, 1905.

Application filed June 8, 1905. Serial No. 264,271.

*To all whom it may concern:*

Be it known that I, ARTHUR WILFRID RANSOME, a citizen of the United States, and a resident of the city of New York, borough of Manhattan, in the county and State of New York, have invented a new and Improved Cart, of which the following is a full, clear, and exact description.

The invention relates particularly to a cart intended to be manually propelled and useful for carrying plastic concrete and other materials. Its principles may, however, be embodied in a horse-drawn cart. It is particularly intended for concrete work where materials have to be dumped from the cart on both horizontal surfaces and over the brink or edge of scaffolds or pits and excavations. These carts are usually constructed with two wheels connected by an axle which supports the body, the dimensions of which are less than the diameter of the wheels, permitting the body to be turned completely over to dump its load without engaging the body with the ground or surface on which the cart may be resting. This arrangement presents serious difficulty when the load is to be dumped into an excavation, since the operator has no convenient means for preventing the cart from turning over too far with its load and thus depositing a portion of its load upon the scaffold instead of over the edge thereof.

It is the object of my invention to provide a cart of this general character which may be readily converted from one intended for use in dumping on horizontal surfaces to a cart well suited for dumping into excavations. In attaining this end I provide a body one end of which projects beyond the periphery of the supporting-wheels, so that this end will engage the edge of the scaffold in the dumping operation and prevent the body of the cart from turning over too far at this time. This enables the operator to bring the cart to the edge of the scaffold and conveniently dump the cart. The other end of the body is arranged to lie within the periphery of the wheels, so that, if desired, the second end may be moved down and under the axle to dump the load of the cart on level surfaces, and in order to render the cart readily convertible from one to the other type I arrange the handles so that they may be shifted from one end to the other of the cart, thus changing the dumping end at will.

My invention also resides in certain special features of construction concerned with the manner in which the handles are removably secured to the body and caused as well to serve as braces for the same.

The invention involves various other features of major or minor importance, all of which will be fully set forth hereinafter, and particularly pointed out in the claims.

Reference is to be had to the accompanying drawings, which illustrate as an example the preferred embodiment of my invention, in which drawings like characters of reference indicate like parts in both the views, and in which—

Figure 1 is a side elevation of the cart, and Fig. 2 is an end view with a part broken away.

$a$ represents the wheels, which mount an axle $b$. On this axle the body $c$ of the cart is mounted in any desired manner, providing, however, that the body may at will be turned from its operative position (shown in Fig. 1) to its inverted or dumping position. According to the form of the invention here shown the body $c$ is constructed of sheet metal. It will be seen from Fig. 1 that the end $c'$ of the body lies inward of the periphery of the wheels $a$, while the end $c^2$ of the body is elongated to project beyond the peripheries of the wheels. The handle comprises a cross member or handle proper, $d$, preferably formed of a tube and tie-rod, as indicated by the broken lines in Fig. 2, and side arms $e$. The side arms extend from the cross member $d$ downward and inward toward the body $c$, and thence turn so as to extend along the upper side edges of the body, to which upper side edges the side arms $e$ are removably yet securely fastened, preferably by bolts and nuts $f$, though by other removable devices, if desired. The side arms $e$ thus arranged not only form parts of a durable handle for the cart, but serve also to brace the side walls of the body of the same. It is also apparent that by removing the bolts $f$ the position of the handle on the body of the cart may be reversed, the handle then taking the position indicated by the broken lines $e'$ in Fig. 1.

Assuming the adjustment shown by full lines in the drawings, it will be seen that the cart may be dumped by elevating the handle from the position shown in Fig. 1 and turning the body $c$ around the axle until the end $c^2$ of the body engages the edge of the scaffold. This will throw out the contents of the body, and it will also prevent further rotary movement of the body of the cart, the projecting end of the body serving as a stop or check for the same. It is this adjustment of the handle which particularly adapts the cart for use in dumping the materials into excavations or pits, since the cart may be brought to the brink of the pit or excavation and the body inverted into dumping position, which operation insures that further rotary movement of the body of the cart toward the pit will be arrested. Assuming the adjustment indicated by broken lines $e'$ in Fig. 1, it will be seen that this arrangement is adapted particularly for dumping the cart on level surfaces, the operator having merely to throw up the handle and, if desired, give a complete half-revolution to the body, the ends $c'$ lying inward of the periphery of the wheels, and therefore clearing the surface on which the cart may be arrested. In this way the entire load of the cart may be instantly and easily dumped on a level surface.

Having thus described the preferred form of my invention, what I claim as new, and desire to secure by Letters Patent, is—

1. A wheeled cart having a dumping-body, one end of which lies inward of the periphery of the wheel or wheels, and the other end of which projects beyond the periphery of the wheel or wheels, and a handle reversibly secured to the body, for the purpose specified.

2. A cart comprising two wheels, an axle connecting the wheels, a dumping-body supported on the axle, the said body having one end lying within the peripheries of the wheels and the other end elongated to project beyond said peripheries, and a reversible handle attached to the body, for the purpose specified.

3. A wheeled cart having a dumping-body, one end of which lies within the periphery of the wheel or wheels, and the other end of which projects beyond said periphery, and a reversible handle capable of connection with the body of the cart to project from either end thereof, as may be desired.

4. A wheeled cart having a dumping-body, and a handle therefor including side arms extending along and fastened to the upper edges of the sides of the body.

5. A wheeled cart having a dumping-body, one end of which lies within the periphery of the wheel or wheels and the other end of which projects beyond such periphery, and a reversible handle comprising side arms adapted to be removably connected to the upper side edges of the body of the cart for the double purpose specified.

6. A cart comprising wheels, an axle connecting the same, a dumping-body carried by the handle, and having one end lying within the peripheries of the wheels and the other end projecting beyond the same, and a handle comprising a cross member and side arms, the side arms being connected to the cross member and extending respectively along and fastened removably to the upper side edges of the body of the cart, whereby to strengthen the body of the cart and to permit the reversal of the handle, for the purpose specified.

In testimony whereof I have signed my name to this specification in the presence of two subscribing witnesses.

ARTHUR WILFRID RANSOME.

Witnesses:
WILLIAM SUTPHEN,
EDITH JUNE FULLER.